(12) United States Patent
Wong et al.

(10) Patent No.: US 12,353,029 B2
(45) Date of Patent: Jul. 8, 2025

(54) OPTICAL FIBER CONNECTOR

(71) Applicant: SENKO Advanced Components, Inc., Hudson, MA (US)

(72) Inventors: Yim Wong, Kowloon (HK); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 270 days.

(21) Appl. No.: 18/052,413

(22) Filed: Nov. 3, 2022

(65) Prior Publication Data

US 2023/0145265 A1 May 11, 2023

Related U.S. Application Data

(60) Provisional application No. 63/276,549, filed on Nov. 5, 2021.

(51) Int. Cl.
*G02B 6/40* (2006.01)
*G02B 6/38* (2006.01)

(52) U.S. Cl.
CPC ......... *G02B 6/403* (2013.01); *G02B 6/38875* (2021.05)

(58) Field of Classification Search
CPC ............................. G02B 6/403; G02B 6/38875
See application file for complete search history.

(56) References Cited

U.S. PATENT DOCUMENTS 5,806,175 A * 9/1998 Underwood ......... G02B 6/3889
29/748
7,712,973 B2 * 5/2010 DiMarco .............. G02B 6/3857
385/98

FOREIGN PATENT DOCUMENTS

CN 101065698 A * 10/2007 ........... G02B 6/3849

OTHER PUBLICATIONS

English translation of CN101065698A (Year: 2007).*

* cited by examiner

*Primary Examiner* — Sung H Pak

(57) ABSTRACT

An optical fiber connector can terminate a plurality of optical fiber cables, each with a jacket encasing at least one optical fiber and a strength element. A connector housing has a back post. The optical fibers of the plurality of optical fiber cables extend into the connector housing through the back post. A single crimp ring crimps the strength members of the plurality of optical fiber cables onto the back post. In a method of terminating a plurality of optical fiber cables, the cables are inserted through a single crimp ring, optical fibers of each of the cables are terminated in a multifiber ferrule, the cables are loaded into a back body of a connector housing, and strength members of the cables are crimped onto a back post using a single crimp ring.

20 Claims, 23 Drawing Sheets

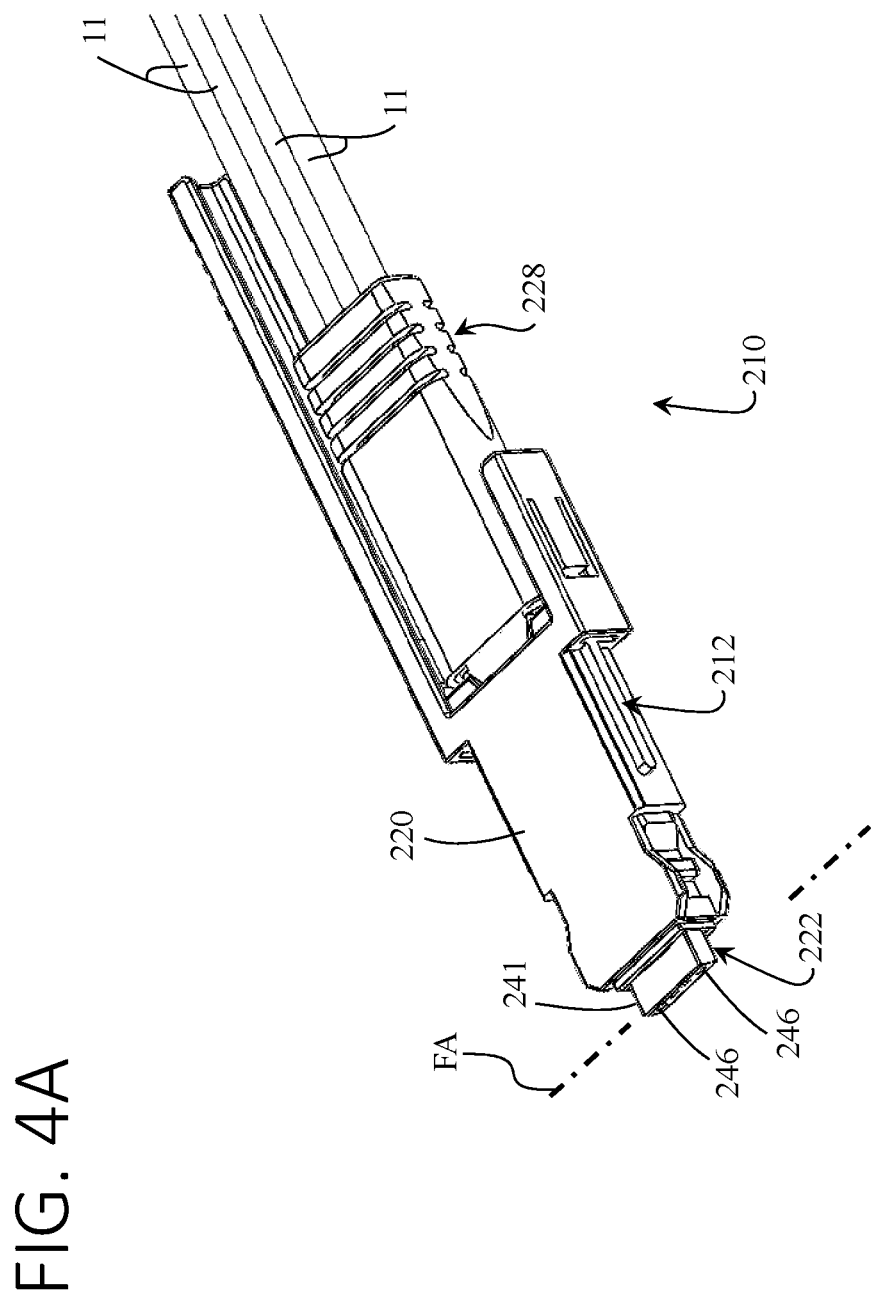

OPTICAL FIBER CONNECTOR

CROSS-REFERENCE TO RELATED APPLICATIONS

This application claims priority to U.S. Provisional Patent Application No. 63/276,549, which is hereby incorporated by reference in its entirety.

FIELD

This disclosure generally pertains to an optical fiber connector.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels can consolidate the increasing volume of interconnections necessary to support fast-growing networks in a compacted form factor, thereby increasing quality of service and decreasing costs such as floor space and support overhead. However, room for improvement in the area of data centers, specifically as it relates to fiber optic connections, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment.

SUMMARY

In one aspect, an optical fiber connector can terminate a plurality of optical fiber cables. Each optical fiber cable comprises a jacket encasing at least one optical fiber and a strength element. The optical fiber connector comprises a connector housing having a back post configured so the optical fibers of the plurality of optical fiber cables extend into the connector housing through the back post. A single crimp ring is configured to crimp the strength members of the plurality of optical fiber cables onto the back post.

In another aspect, a method of terminating a plurality of optical fiber cables comprises inserting a plurality of optical fiber cables through a single crimp ring. Optical fibers of each of the plurality of optical fiber cables are terminated in a multifiber ferrule. The plurality optical fiber cables are loaded into a back body of a connector housing. Strength members of the plurality of optical fiber cables are crimped onto a back post of the back body using a single crimp ring.

Other aspects and features will be apparent hereinafter.

BRIEF DESCRIPTION OF THE DRAWINGS

FIG. 4A is another perspective of the breakout VSFF connector;

Corresponding parts are given corresponding reference characters throughout the drawings.

DETAILED DESCRIPTION

Figure 1:
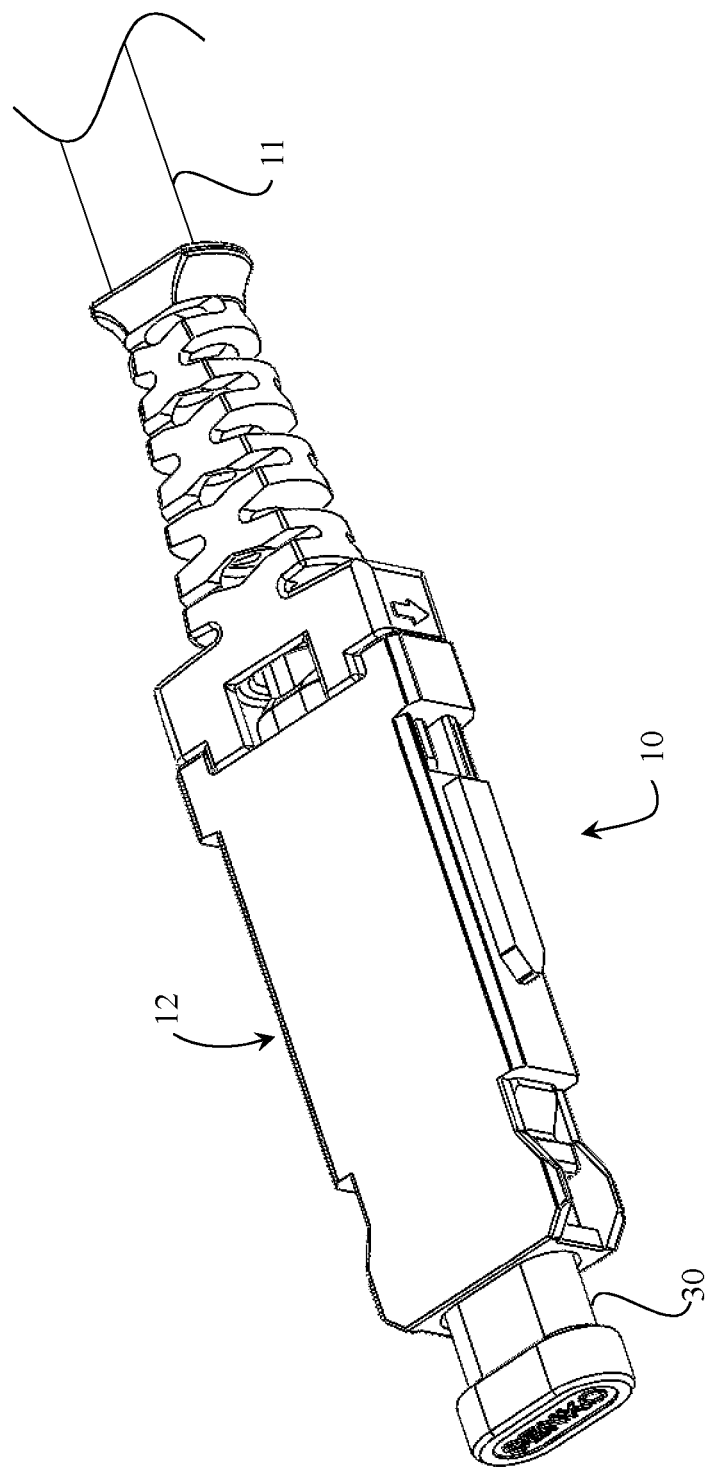
FIG. 1 is a perspective of a conventional very small form factor (VSFF) connector.
Figure 2:
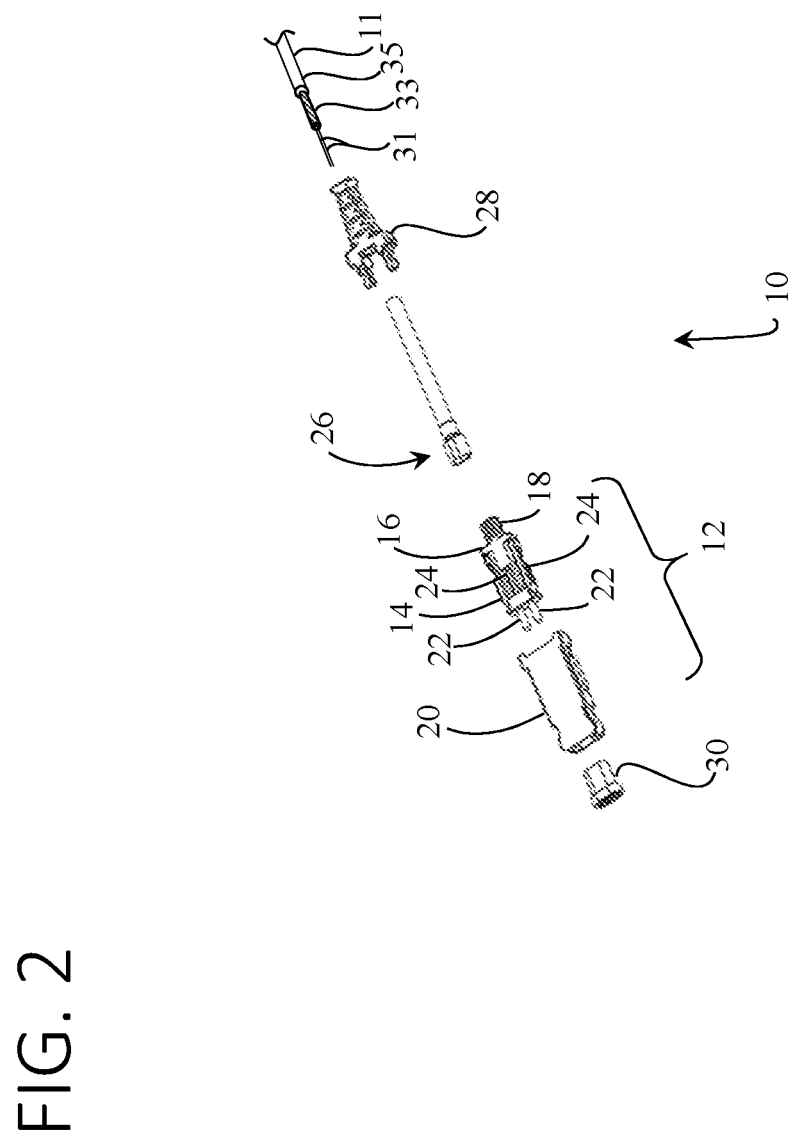
FIG. 2 is an exploded perspective of the VSFF connector of FIG. 1.

Referring to FIG. 1, a conventional very small form factor (VSFF) connector is shown at reference number 10. The illustrated VSFF connector 10 is an SN-type connector. SN connectors are sold by the assignee of the present disclosure. The VSFF connector 10 is configured to terminate an optical fiber cable 11. In the illustrated embodiment, the optical fiber cable 11 comprises two optical fibers 31, tensile strength members 33 (such as stranded Kevlar), and a cable jacket 35 encasing the optical fibers and the strength members. As shown in FIG. 2, the connector 10 may comprise a connector housing 12, an inner front body 14, a back body 16, a back post 18, and an outer housing 20. The connector 10 may further comprise a pair of single-fiber ferrules 22 and corresponding ferrule springs 24. The single cable 11 enters the connector housing 12 through the back post 18 and the ferrules 22 terminate the optical fibers 21. A crimp ring 26 is used to secured strength members 33 of the cable 11 to the back post. A strain relief boot 28 is secured to the rear end of the housing 12 so that the strain relief boot covers part of the cable jacket 35 and provides strain relief. In FIG. 1, a dust cap 30 is releasably secured to the front end of the housing 12 to protect the ferrules 22.

Figure 3:
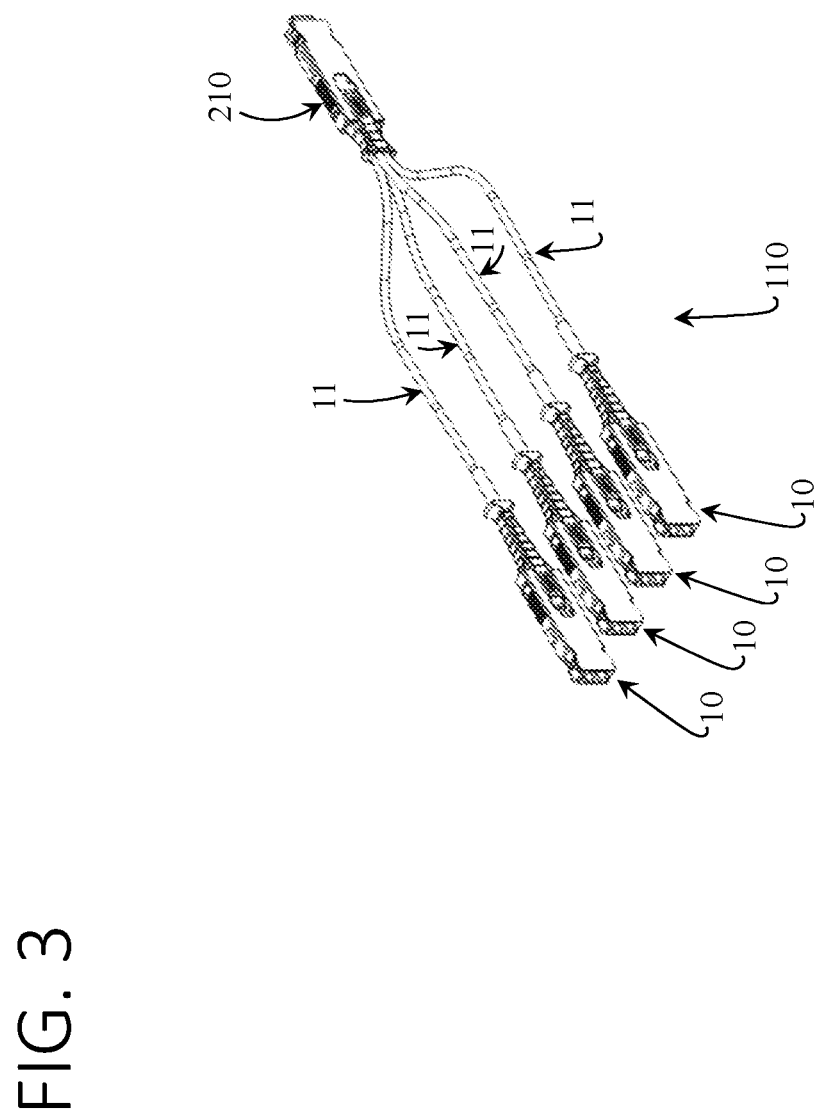
FIG. 3 is a perspective of a breakout cable assembly.

Referring to FIG. 3, an optical fiber breakout cable assembly in the scope of this disclosure is generally indicated at reference number 110. This breakout cable assembly and a number of other breakout cable assemblies in the scope of this disclosure are presented in U.S. patent application Ser. No. 17/937,006, filed Sep. 30, 2022, which is hereby incorporated by reference in its entirety for all purposes. The break out cable assembly 110 comprises a plurality of VSFF connectors 10 and a single breakout connector 210. As explained in further detail below, a prominent aspect of this disclosure pertains to exemplary configurations for the breakout connector 210, particularly, breakout connector configurations that allow for multiple cables to extend out of a single back post, single crimp ring, and/or single strain relief boot.

In the illustrated embodiment, each VSFF connector 10 comprises a two-fiber connector configured to terminate a single two-fiber cable 11. But it will be understood that other fiber breakout cable assemblies in the scope of this disclosure can use VSFF connectors opposite the breakout connector that are configured to terminate individual cables having other numbers of optical fibers. Opposite the individual connectors 10, the breakout connector 210 terminates all of the cables 11. In the illustrated embodiment, there are four cables 11. Accordingly, the illustrated breakout connector 210 is configured to terminate four cables 11 having a total of eight optical fibers. It will be understood that other fiber breakout cable assemblies in the scope of this disclosure can use breakout connectors configured to terminate other numbers of cables and/or cables having other numbers of optical fibers. For example, U.S. patent application Ser. No. 17/937,006 discloses an alternative embodiment in which the breakout cable assembly comprises a breakout connector configured to terminate four eight-fiber cables.

Figure 4:
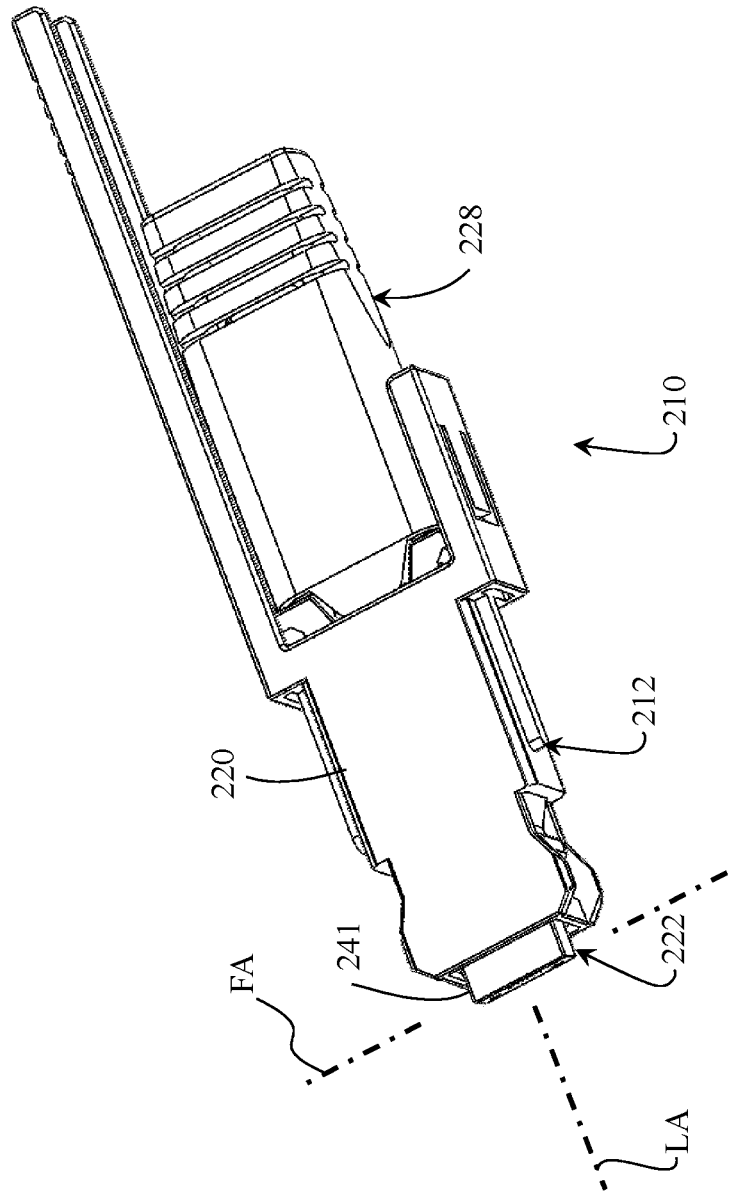
FIG. 4 is a perspective of a breakout VSFF connector.
Figure 4B:
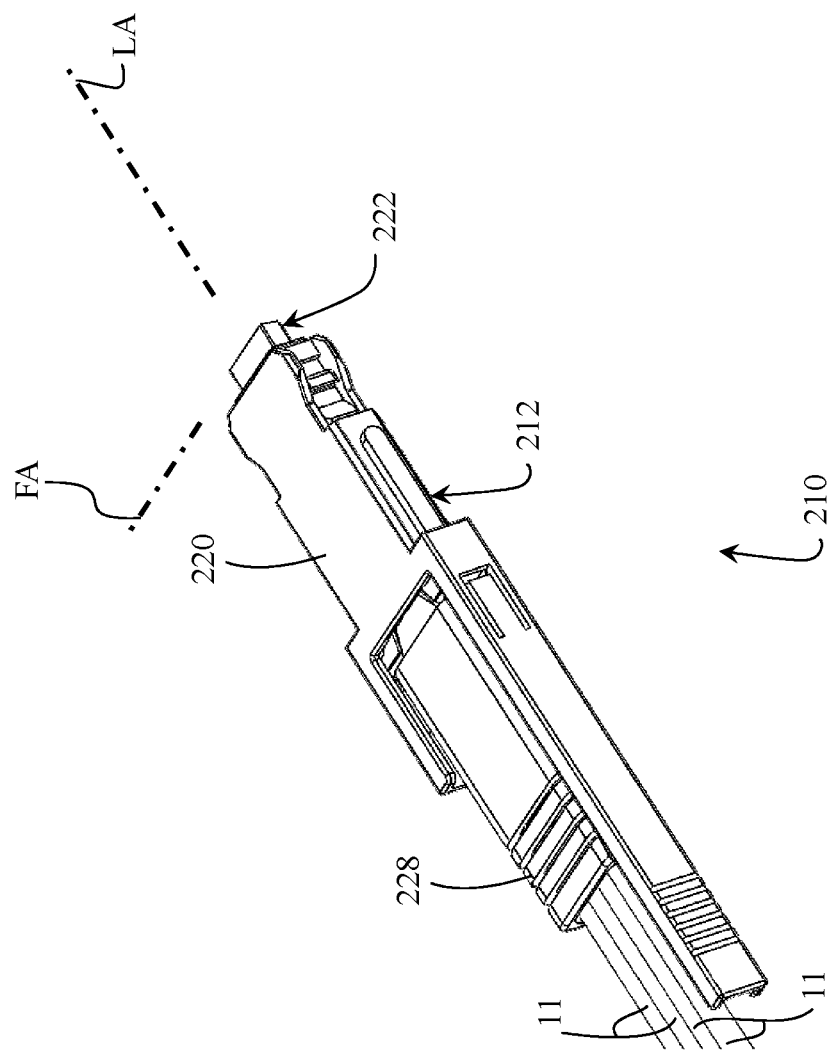
FIG. 4B is another perspective of the breakout VSFF connector.
Figure 5:
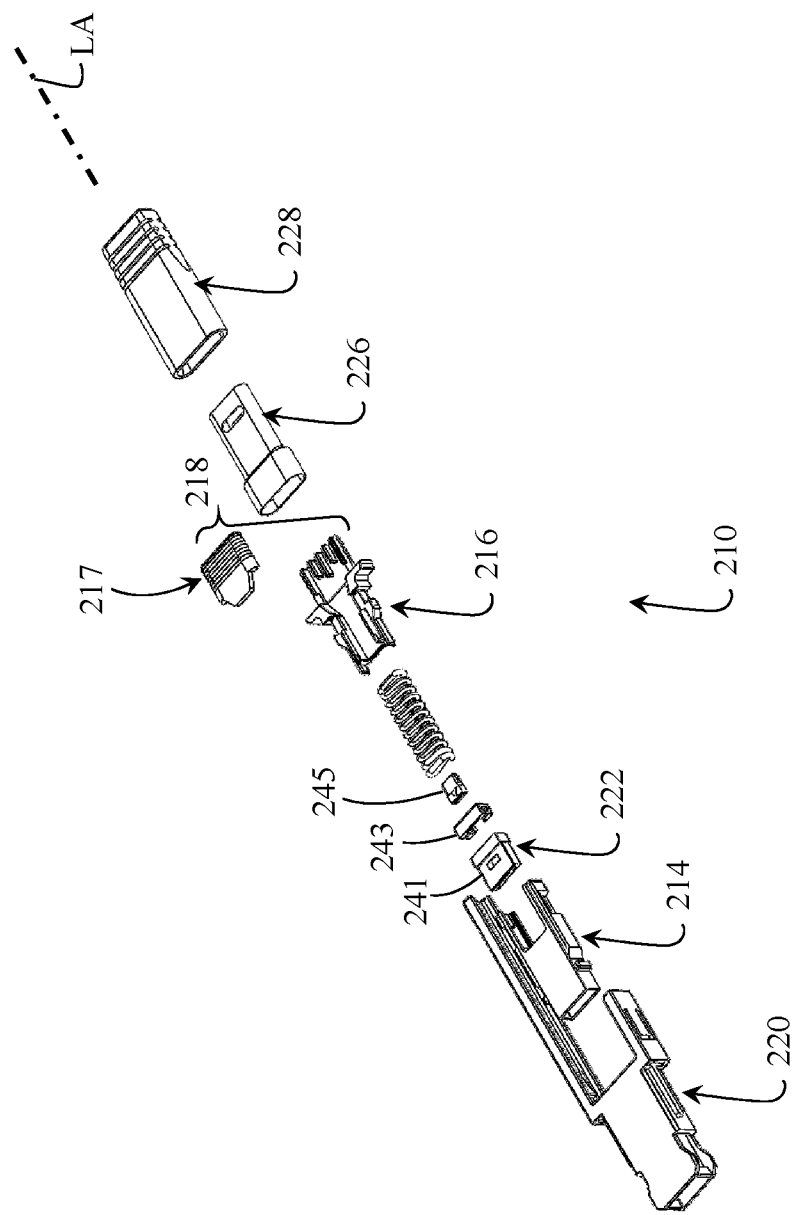
FIG. 5 is an exploded perspective of the breakout VSFF connector.

Referring to FIGS. 4-5, the breakout connector 210 is generally configured for terminating a plurality of optical fiber cables 11 (e.g., 4 optical fiber cables). The breakout connector 210 provides a single plug that directly breaks out into four separate cables 11. This enables the breakout cable assembly 110 discussed above to be devoid of mid-span fan outs, shuffle boxes, or cassettes between the breakout connector 210 and the individual connectors 10.

The breakout connector 210 broadly comprises a connector housing 212 having a longitudinal axis LA. The connector 212 is configured to hold a single multifiber MT ferrule 222 so that the optical contact face of the ferrule faces forward along the longitudinal axis LA. The MT ferrule 222 is configured to terminate the optical fibers 31 of the four cables 11. The MT ferrule 222 comprises a ferrule body 241, a pin holder 243, and a ferrule boot 245 configured to receive ribbonized optical fibers. The ferrule body 241 has at least one row of ferrule openings through the forward facing contact face. Each row of ferrule openings extends parallel to a fiber alignment axis FA of the connector 210, which is perpendicular to the longitudinal axis LA. The ferrule body 241 also has a pair of guide pin openings 246 (FIG. 4A) spaced apart along the fiber alignment axis LA. The pin holder 243 is configured to align with the guide pin openings 246 for selectively retaining guide pins (not shown) in the guide pin openings.

In the illustrated embodiment, the connector housing 212 is a VSFF connector housing, more particularly, an SN-MT connector housing. It will be understood, however, that the principles of this disclosure can be adapted for a breakout connector comprising another type of connector housing, e.g., another type of VSFF connector housing such as a CS connector housing, an MDC connector housing, or an MMC connector housing. In the SN-MT-style connector 210, the connector housing 212 comprises an outer housing 220 and an inner housing assembly 213 (FIG. 16) retaining the ferrule 222 and a ferrule spring 224 in the connector housing. As is known to those skilled in the art, in the SN-MT-style connector 210, the outer housing 220 functions as a latch release actuator. To unlatch the connector 210 from a mating adapter, the outer housing 220 (broadly, the latch release actuator) is displaced rearward along the longitudinal axis LA of the connector in relation to a front body 214, the ferrule 222, and a back body 216. Other types of pullback unlatch actuators can also be used on a connector housing (e.g., the pullback latch release arm of a CS, MDC, or MMT connector) without departing from the scope of the disclosure.

The inner housing assembly 213 comprises the front body 214, the back body 216, and a back post cover 217. The back body 216 is configured to be secured to the front body 214 to capture the ferrule spring 224 and the ferrule 222 in the inner connector housing assembly 213 so that the spring yieldably biases the ferrule forward in the connector housing 212. As explained more fully below, the back body 216 and the back post cover 217 are configured to form a back post 218 (FIG. 16) of the connector 210. Each of the cables 11 extends into the connector housing 212 through the back post 218. The back post 218 is configured to retain the cables 11 in a single file cable row that extends parallel to the fiber alignment axis FA. The connector 210 further comprises a single crimp ring 226 configured to be crimped onto the back post 218 and a single cable strain relief boot 228 configured to be disposed over the crimp ring and the cables 11. It can be seen that each of the cables 11 extends into the connector 210 through the back post 218, each of the cables extends into the connector through the crimp ring 226, and each of the cables extends into the connector through the strain relief boot 228.

Figure 6:
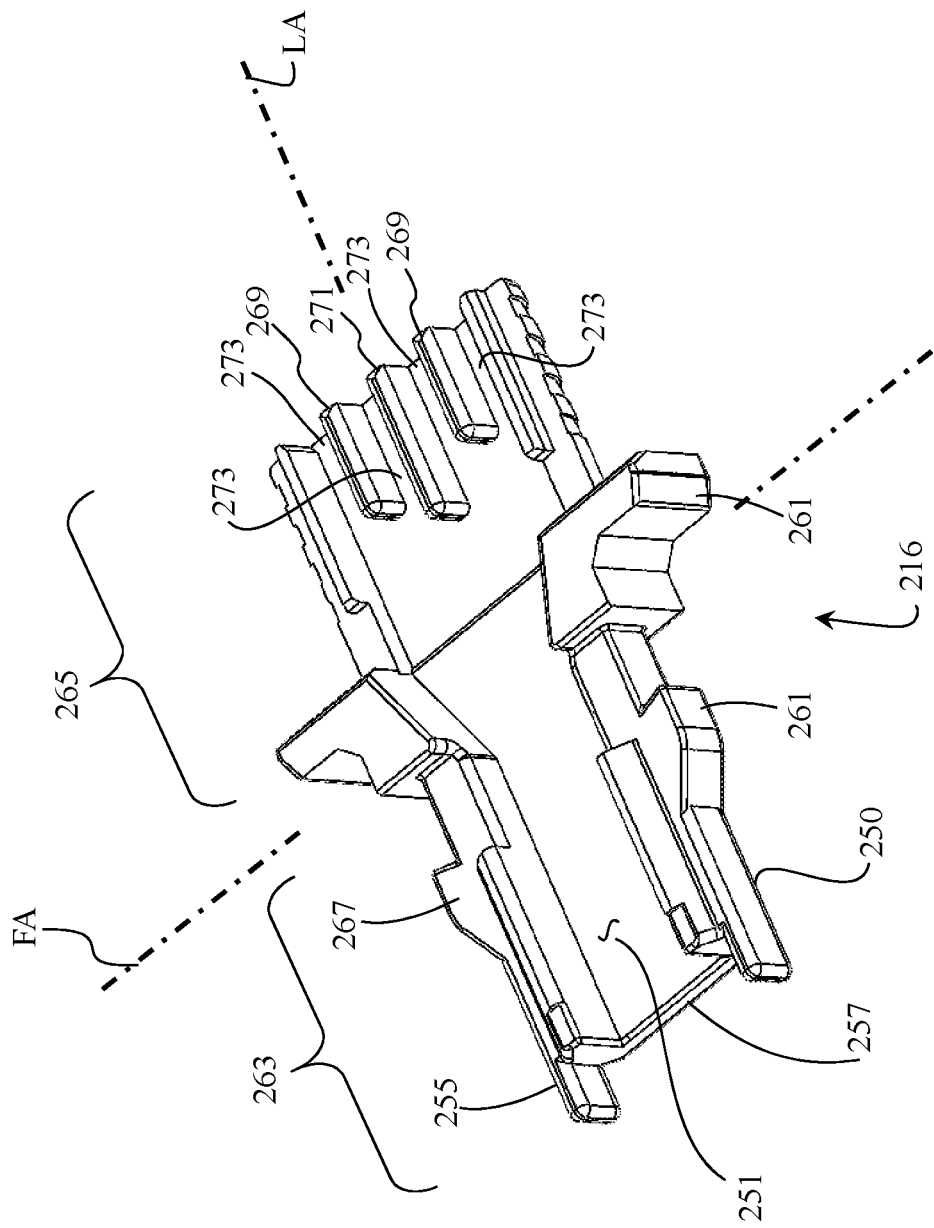
FIG. 6 is a perspective of a back body of the breakout VSFF connector.
Figure 7:
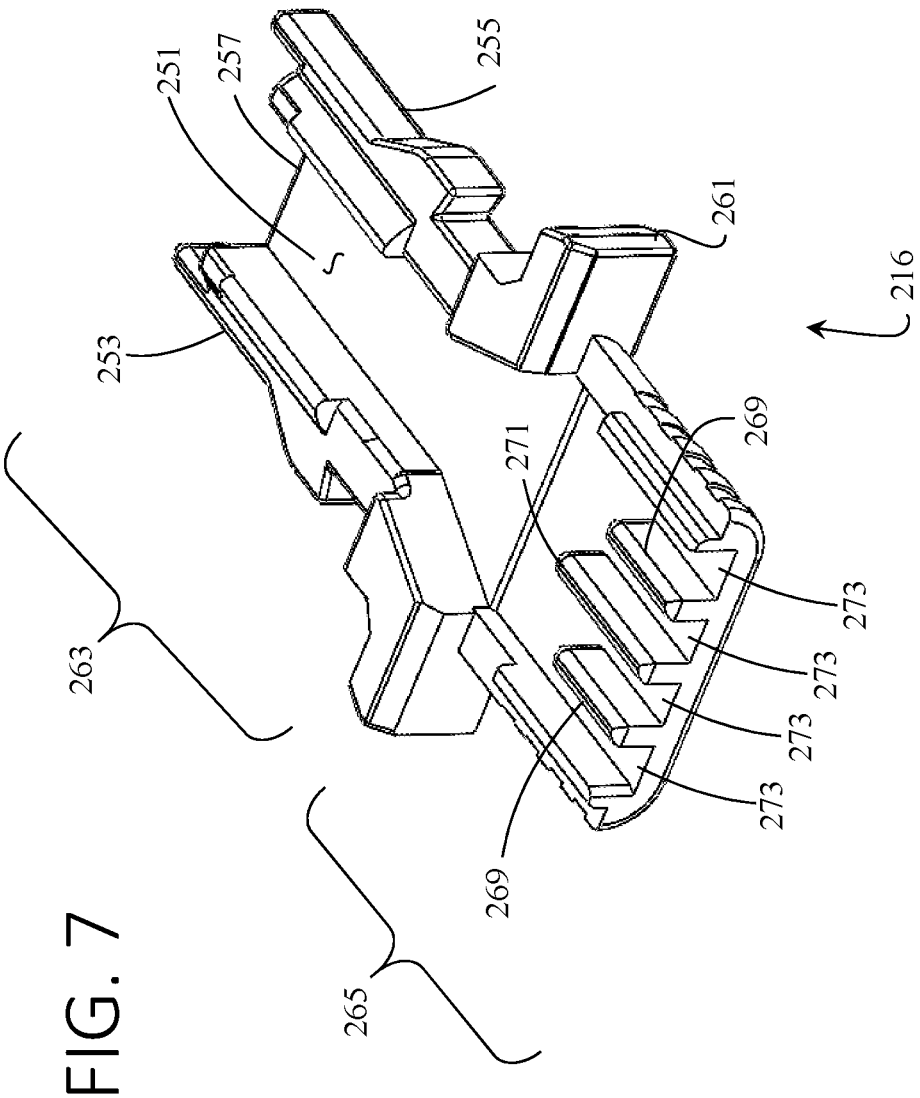
FIG. 7 is another perspective of the back body.

Referring to FIGS. 6-7, the back body 216 defines a passage 251 that extends along the longitudinal axis LA from a rear end portion through a front end portion of the back body 216. The back body 216 comprises opposite first and second side walls 253, 255 spaced apart along the fiber alignment axis FA on opposite ends of the passage 251. The back body 251 also comprises one end wall 257 extending along the fiber alignment axis FA from the first side wall 253 to the second side wall 255 on one side of the passage 251. The passage 251 has an open side opposite the first end wall 257. The open side of the passage 251 allows the optical fibers 31 to be loaded laterally into the back body 216 (those skilled in the art sometimes refer to this as "side-loading" fibers into the back body).

The back body 216 comprises a flange 261 that separates a font body attachment section 263 from a back post section 265. Along the front body attachment section 263, the side walls 253, 255 define opposing attachment wings 267 that are configured to latch with corresponding recesses of the front body 214 to secure the back body to the front body. The back post section 265 is configured to be secured to the back post cover 217 to form the back post 218. When the back post section 265 is secured to the back post cover 217 to form the back post 218, the back post has a perimeter that extends 360° circumferentially around the longitudinal axis LA. The cross-sectional shape of the outer perimeter of the back post 218 is elongated along the fiber alignment axis FA. The back post section 265 forms a first circumferential section of the 360° perimeter of the back post 218, and the back post cover 217 defines an entire remainder of the 360° perimeter.

The back body 216 comprises at least one rib 269, 271 configured to partition the back post into a plurality of fiber channels 273. In the illustrated embodiment, the back body comprises a central rib 271 and a pair of outer ribs 269 spaced apart from the central rib along the fiber alignment axis FA on opposite sides of the central rib. Each rib 269, 271 extends generally parallel to the longitudinal axis LA and has a respective length along the longitudinal axis. In one or more embodiments, the length of the central rib 271 is greater than the lengths of the outer ribs 269.

The ribs 269, 271 are located along the back post section 265 to function as dividers that partition the interior of the back post 218 into a plurality of internal channels 273. The back post 218 is configured to receive the fibers 31 of each optical fiber cable 11 in a respective one of the plurality of channels 273. This separates and organizes the fibers 31 by cable as they enter the housing 212 through a single back post 218.

In the illustrated embodiment, the back body 216 defines open-sided channels 273 to allow side loading of the fibers 231 into the channels. After the fibers 231 are loaded into the channels 273, the back post cover 217 is configured to enclose each of the channels.

The ribs 269 are configured to maintain separation between the fibers 231 along the back post section 265 of the back body, whereas the back body passage 251 is undivided along the front body attachment section 263 so that the fibers 231 can come together as a ribbon in the front body attachment section. The difference between the lengths of the central rib 271 and the outer ribs 269 allows the fibers in the outer channels 273 to bend gradually inward along the fiber alignment axis FA (within the bending radius tolerance of the optical fibers) as they extend forward along the longitudinal axis LA to come together with the other fibers as a ribbon in the front body attachment section 263 of the back body.

Figure 8:
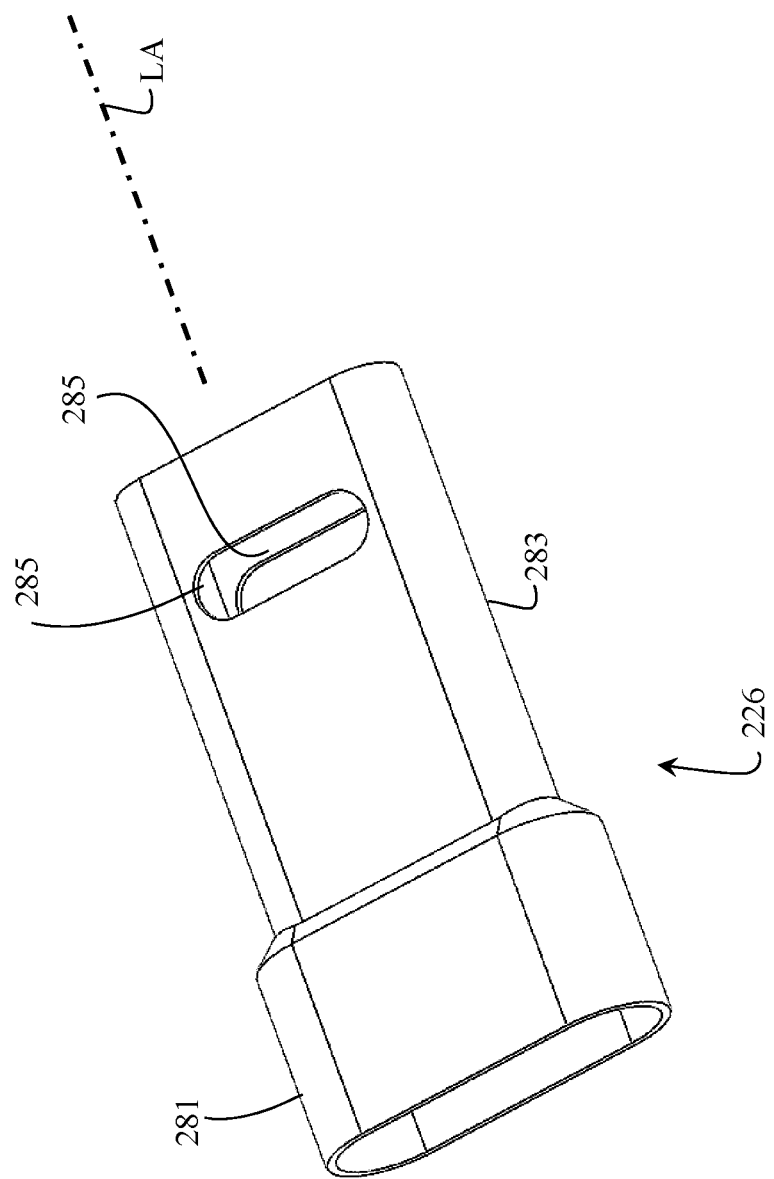
FIG. 8 is a perspective of a crimp ring of the breakout VSFF connector.
Figure 9:
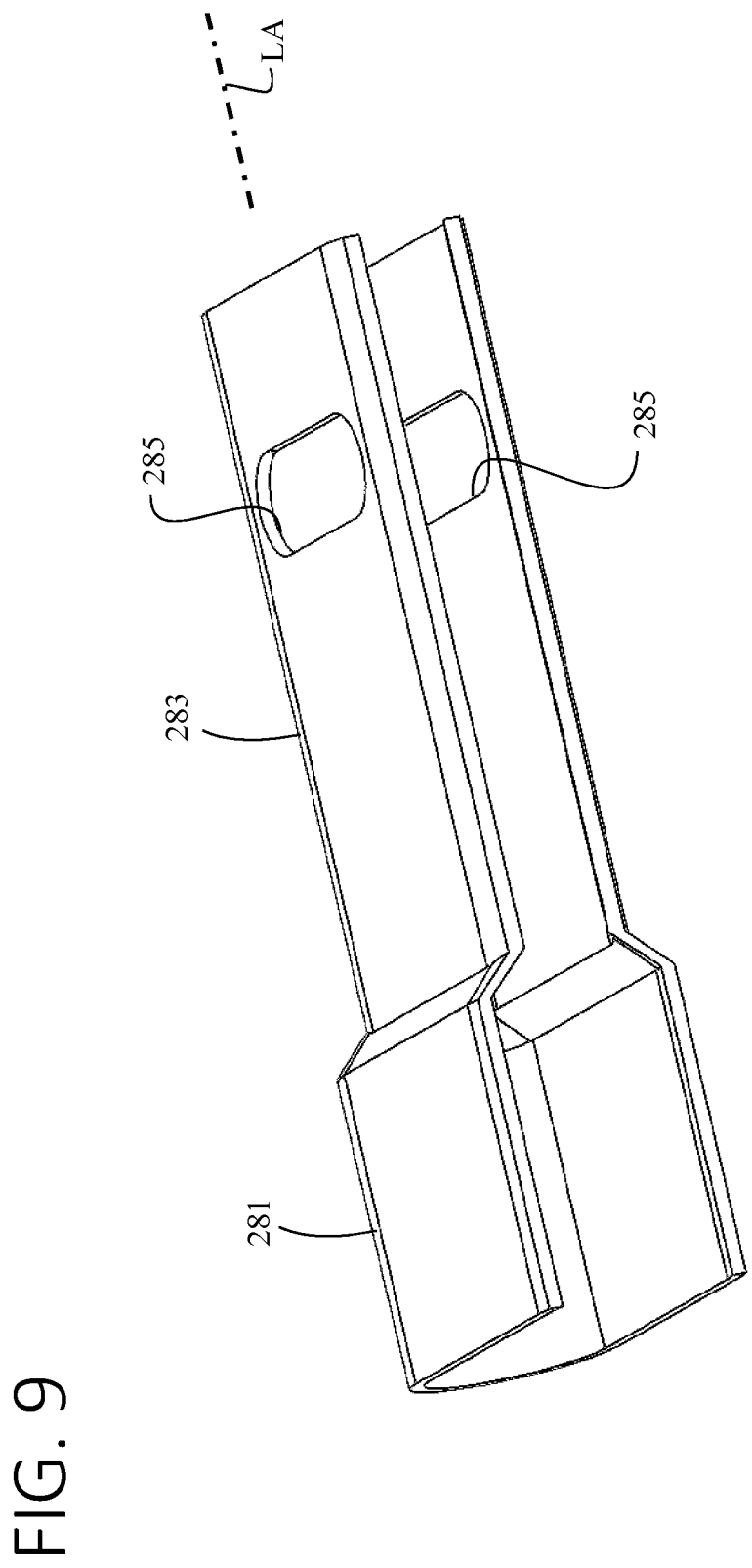
FIG. 9 is a cross-sectional perspective of the crimp ring.

Referring to FIGS. 8-9, the crimp ring 226 comprises a crimpable front section 281 and a back section 283 spaced apart along the longitudinal axis LA. The front section 281 has an inner perimeter that corresponds in shape to the perimeter of the back post 218 so that the front section can receive the back post therein and be crimped onto the back post. The back section 283 has smaller cross-sectional size that the front section 281 and defines a pair of glue ports 285 through which glue can be imparted into the interior of the crimp ring 226.

Figure 10:
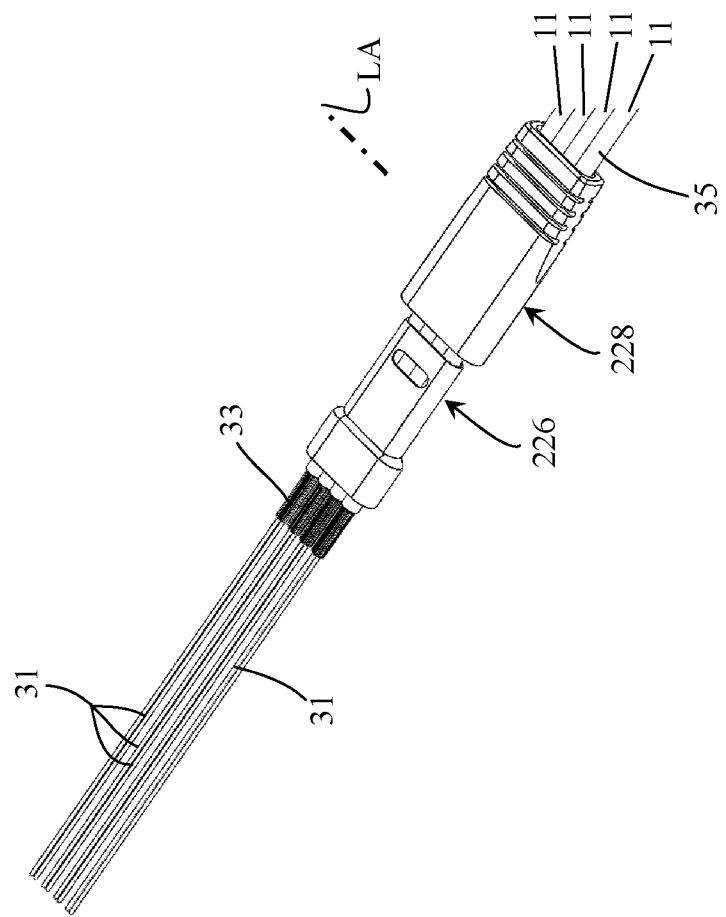
FIG. 10 is a perspective showing a step in a method of terminating a plurality of optical fiber cables with the breakout VSFF connector.
Figure 11:
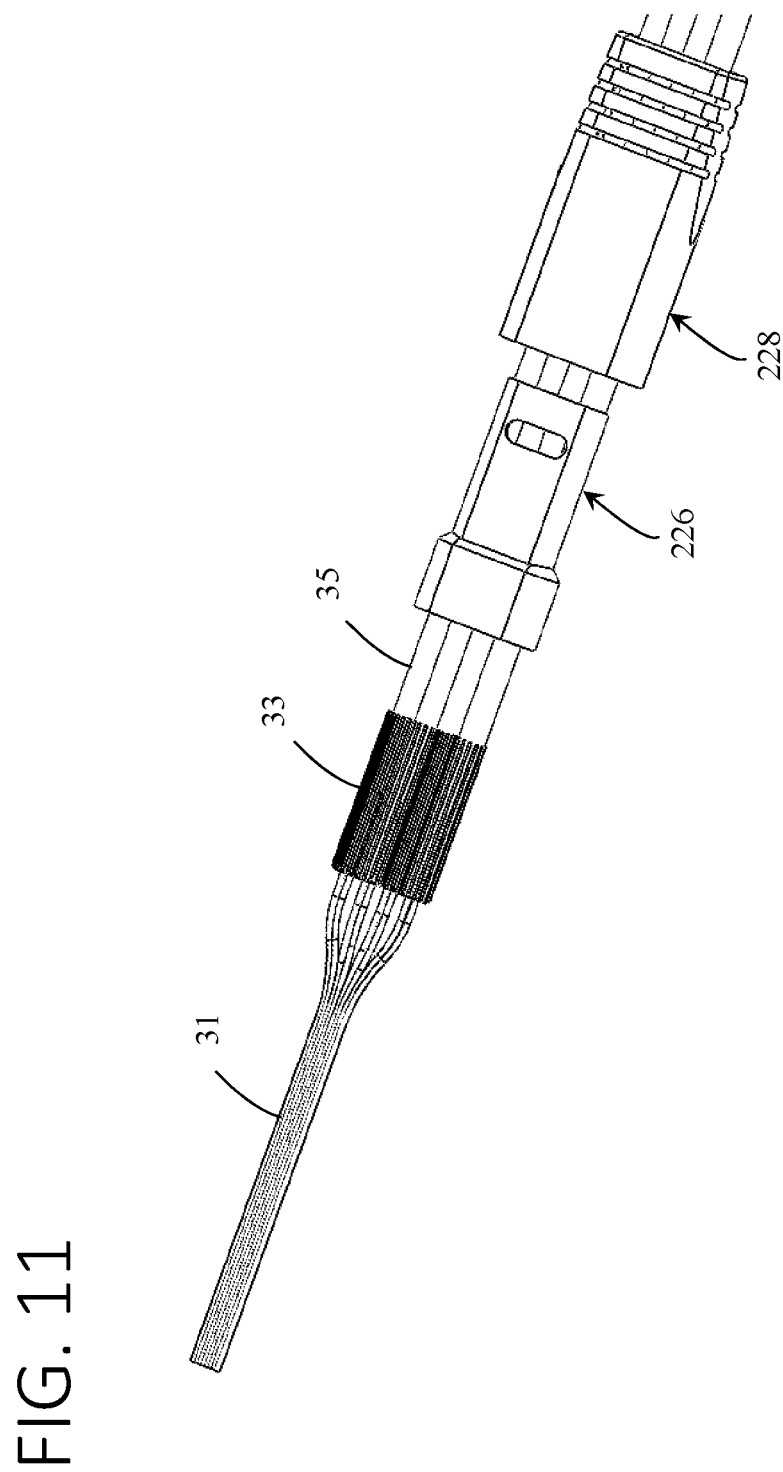
FIG. 11 is a perspective showing a subsequent step in the method.
Figure 12:
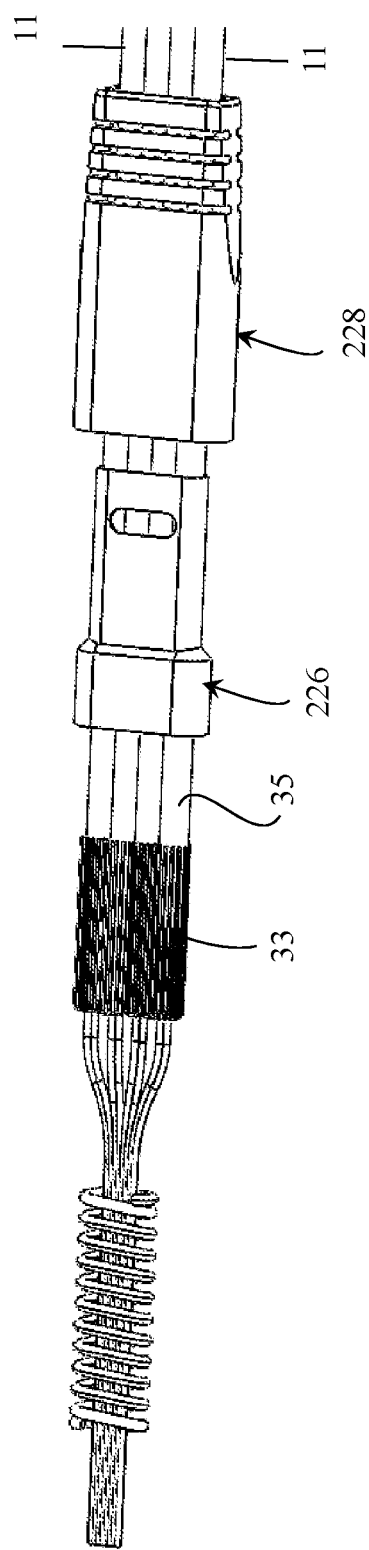
FIG. 12 is a perspective showing a subsequent step in the method.
Figure 13:
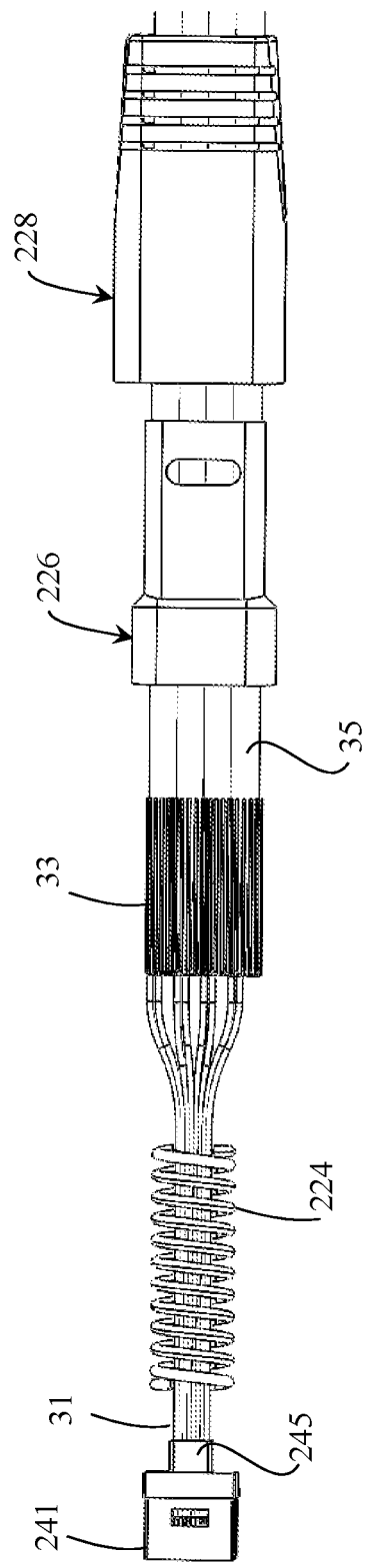
FIG. 13 is a perspective showing a subsequent step in the method.

Referring to FIGS. 10-21, an exemplary method of using the breakout connector 210 to terminate a plurality of optical fiber cables 11 will now be described. As shown in FIG. 10, at an initial stage, the ends of four optical fiber cables 11 are inserted into the single cable boot 228 and the single crimp ring 226. The cable boot 228 and the crimp ring 226 receive the cables 11 in a single file cable row. At ends of each of the cables 11, a portion of each jacket is removed to expose the strength members 33 which are folded backward onto the remaining jacket to further expose fibers 31. As shown in FIG. 11, the bare fibers 31 are then brought together to form a fiber ribbon. As shown in FIG. 12, the ribbonized fibers are inserted into a ferrule spring 224. Referring to FIG. 13, next the ribbonized fibers 31 are inserted through the ferrule boot 245 and terminates the fibers in the ferrule body 222.

Figure 14:
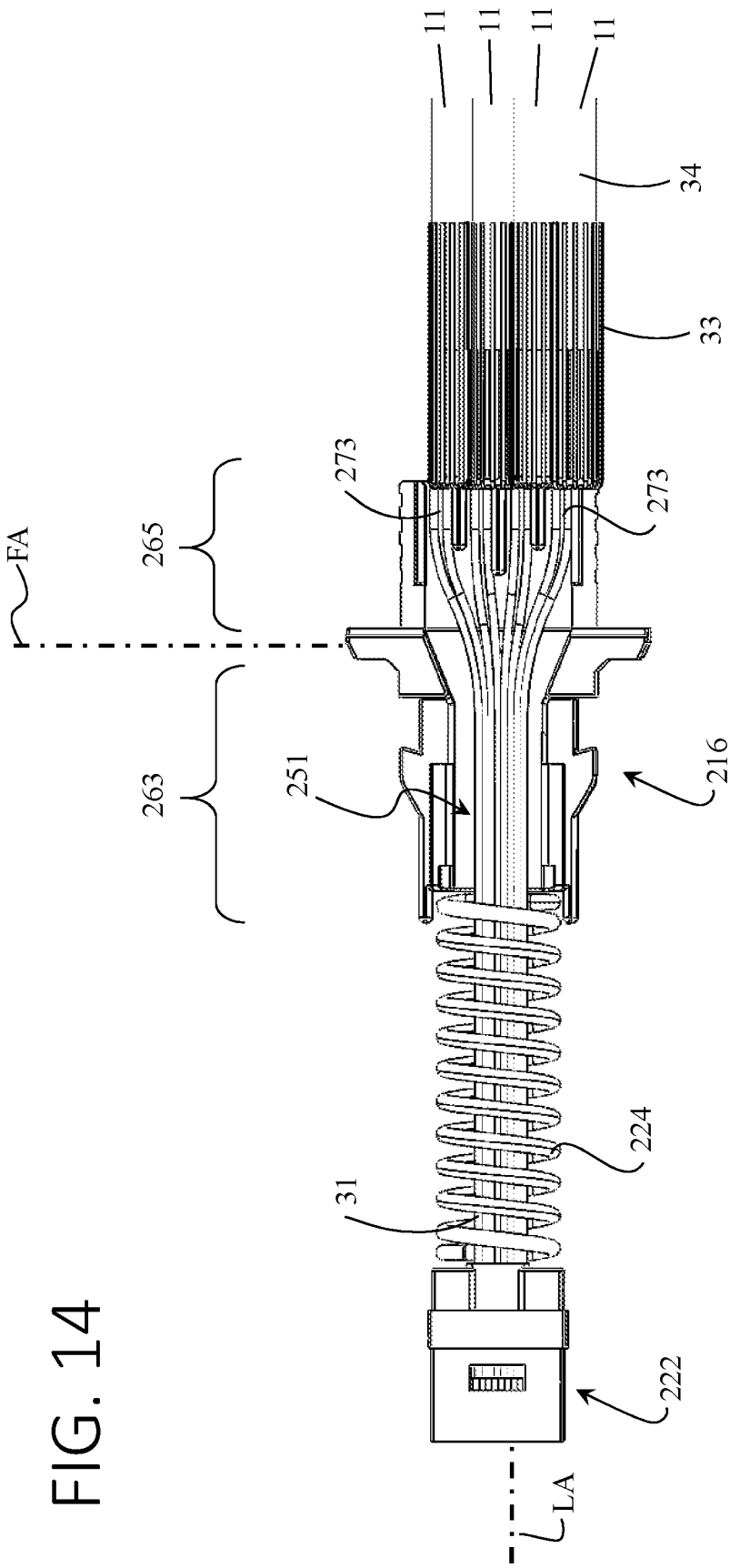
FIG. 14 is a perspective showing a subsequent step in the method.

Referring to FIG. 14, the optical fiber cables 11 are subsequently loaded into the back body 216. More particularly, the cables are loaded into the back body 216 by moving the exposed optical fibers 31 laterally into the passage 251. A ribbonized section of the optical fibers 31 is loaded into the undivided section of the passage 251 along the front body attachment section 263. From the ribbonized section, as the fibers 31 extend rearward, the fibers separate into groupings by cable. Each cable-specific grouping of fibers 31 is side-loaded into a respective channel 273 in the back post section 265 of the back body 216. When the cables 11 have been side-loaded into the back body 216 in this fashion, the individual groupings of fibers 31 curve gently outward along the fiber axis FA as they extend away rearward along the longitudinal axis LA away from the ribbonized section toward the channels 273.

Figure 15:
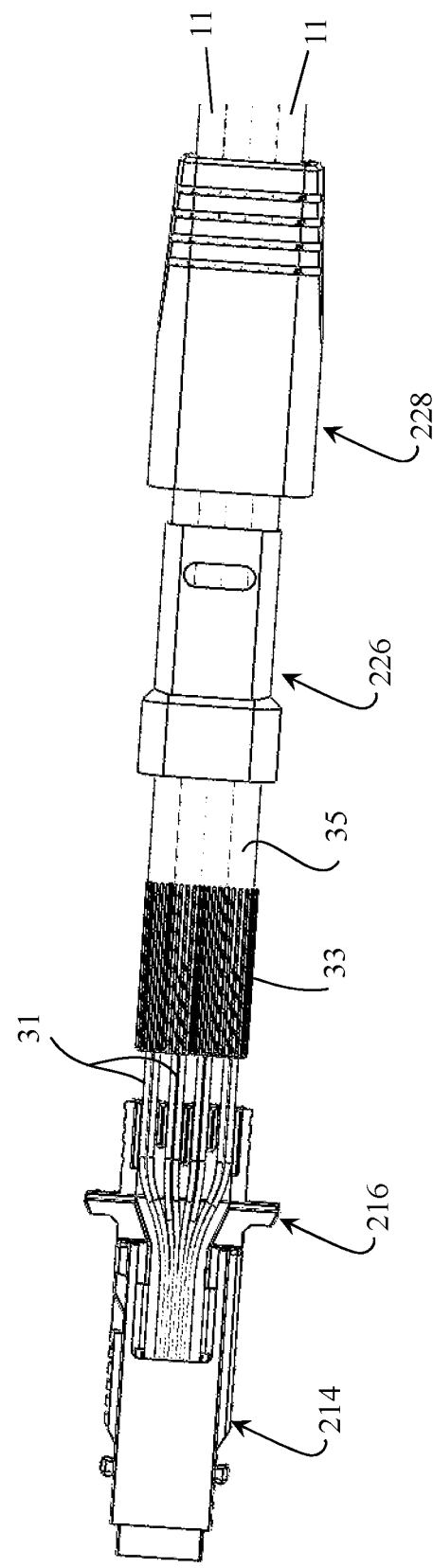
FIG. 15 is a perspective showing a subsequent step in the method.
Figure 16:
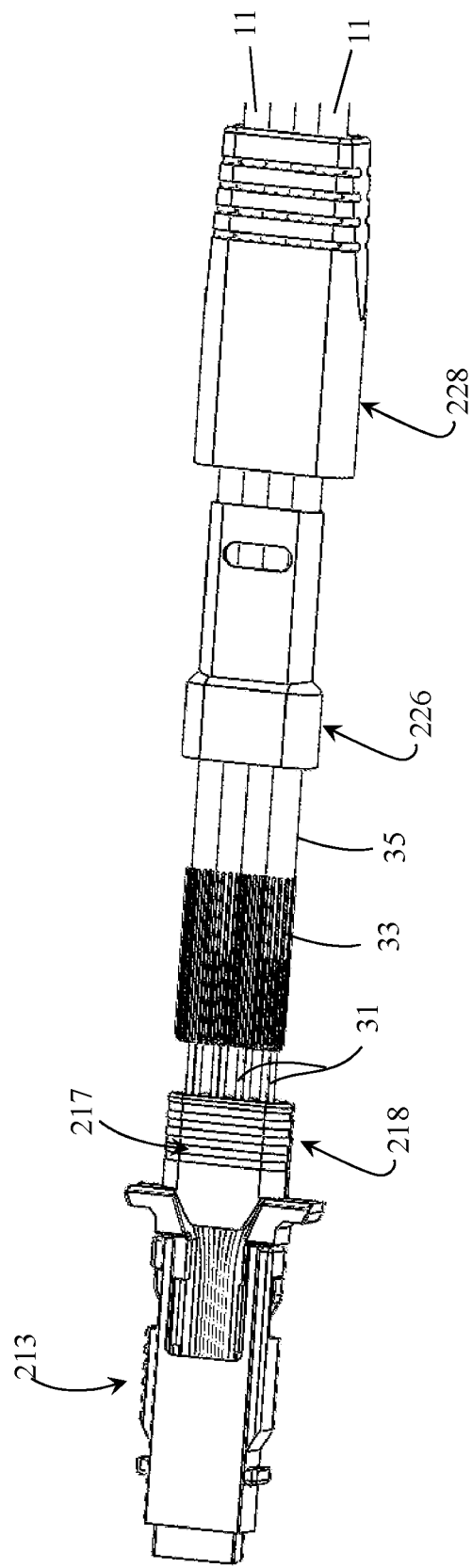
FIG. 16 is a perspective showing a subsequent step in the method.

As shown in FIG. 15, after the cables 11 have been side-loaded into the back body 216, the front body 214 is installed on the back body 216 to secure the ferrule 222 and load the ferrule spring 224. As shown in FIG. 16, to complete the inner housing assembly 213 and form the back post 218, the back post cover 217 is placed onto the back post. This encloses the divided fiber channels 273 so that each grouping of fibers is retained in its respective channel.

Figure 17:
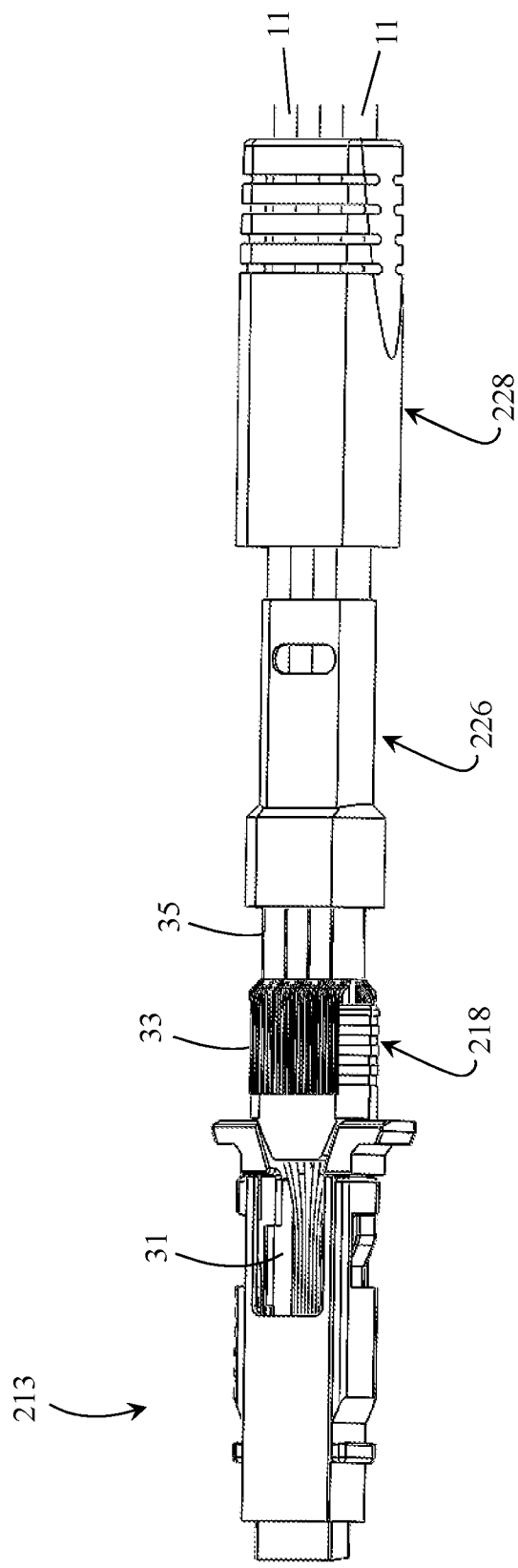
FIG. 17 is a perspective showing a subsequent step in the method.
Figure 18:
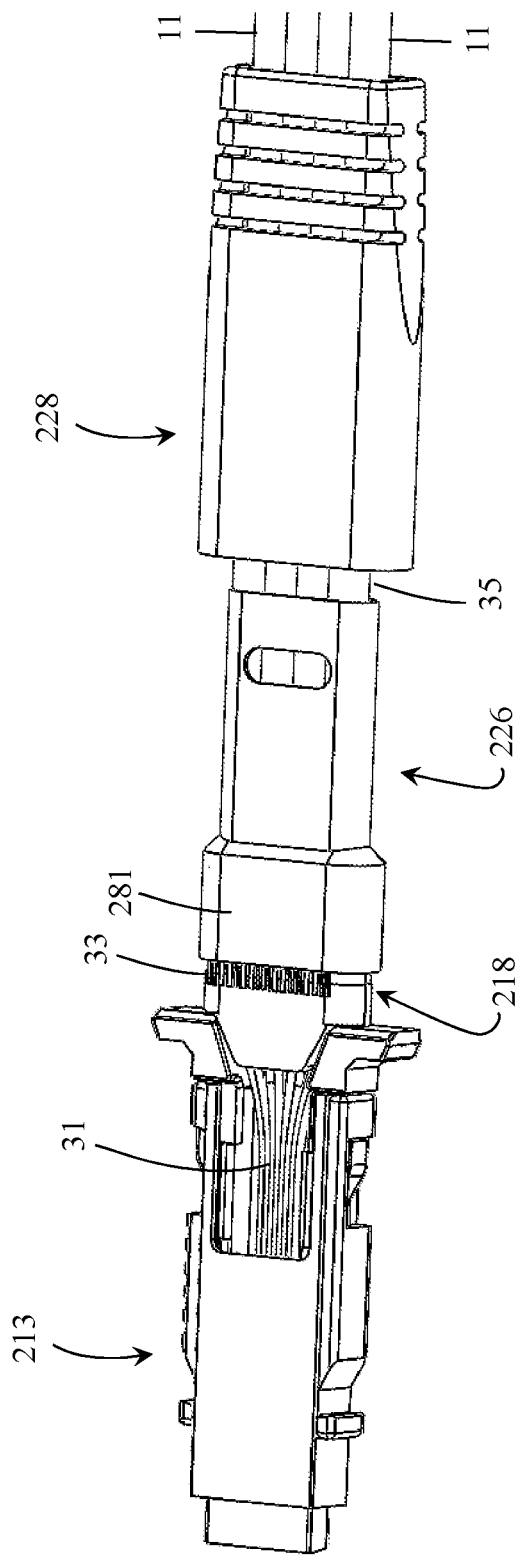
FIG. 18 is a perspective showing a subsequent step in the method.
Figure 19:
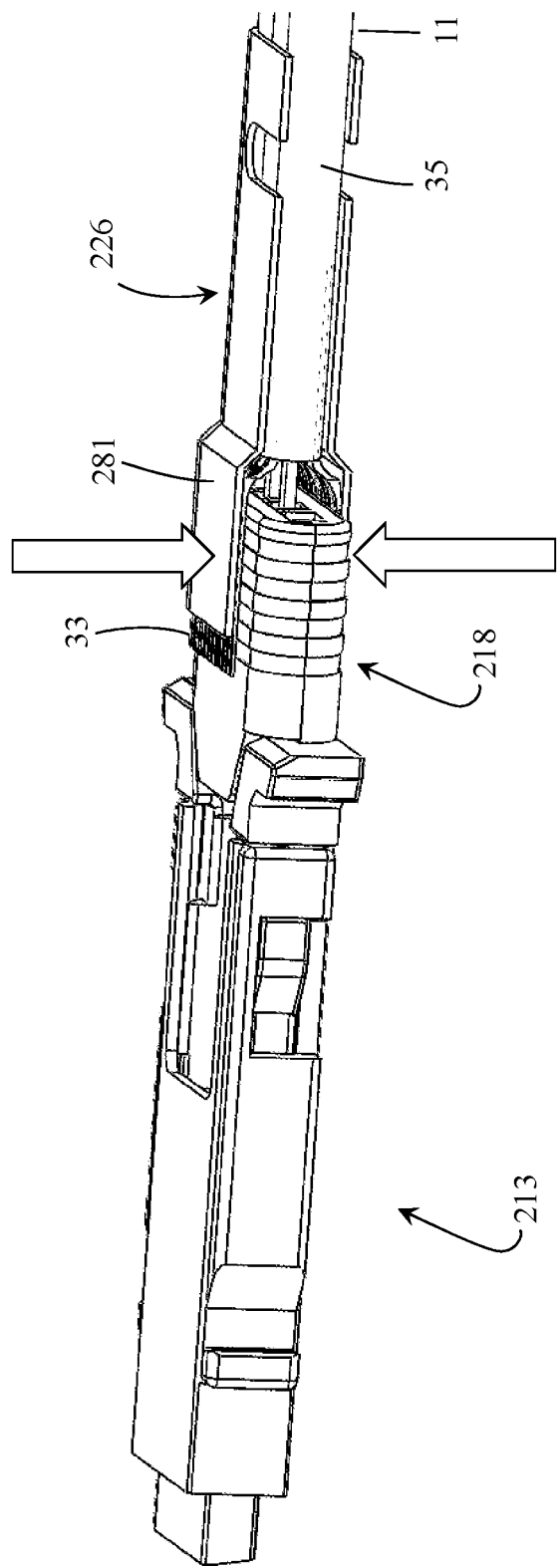
FIG. 19 is a perspective showing a subsequent step in the method.
Figure 20:
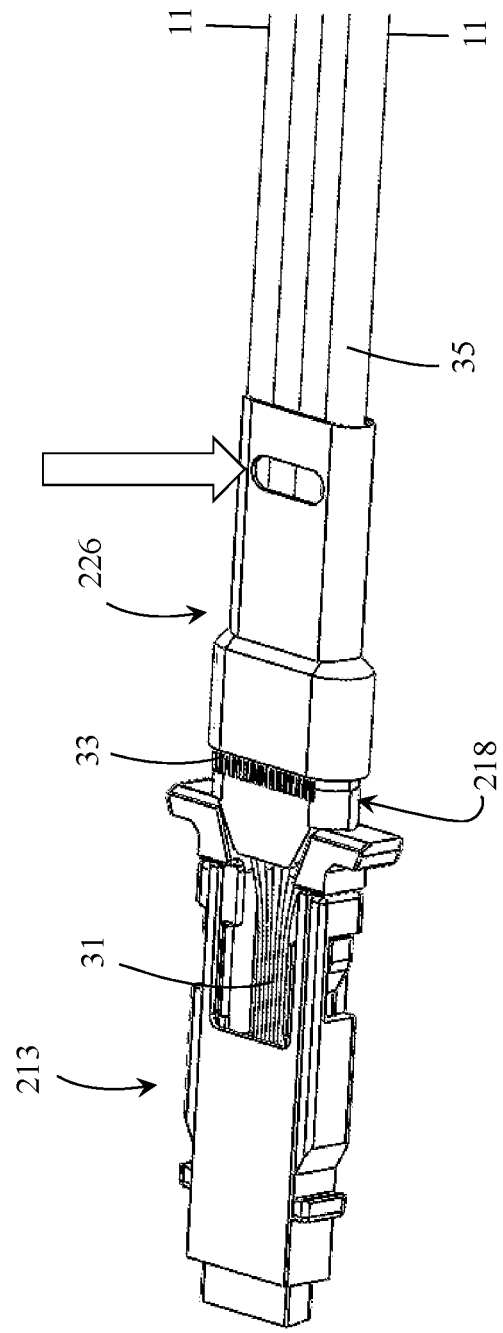
FIG. 20 is a perspective showing a subsequent step in the method.
Figure 21:
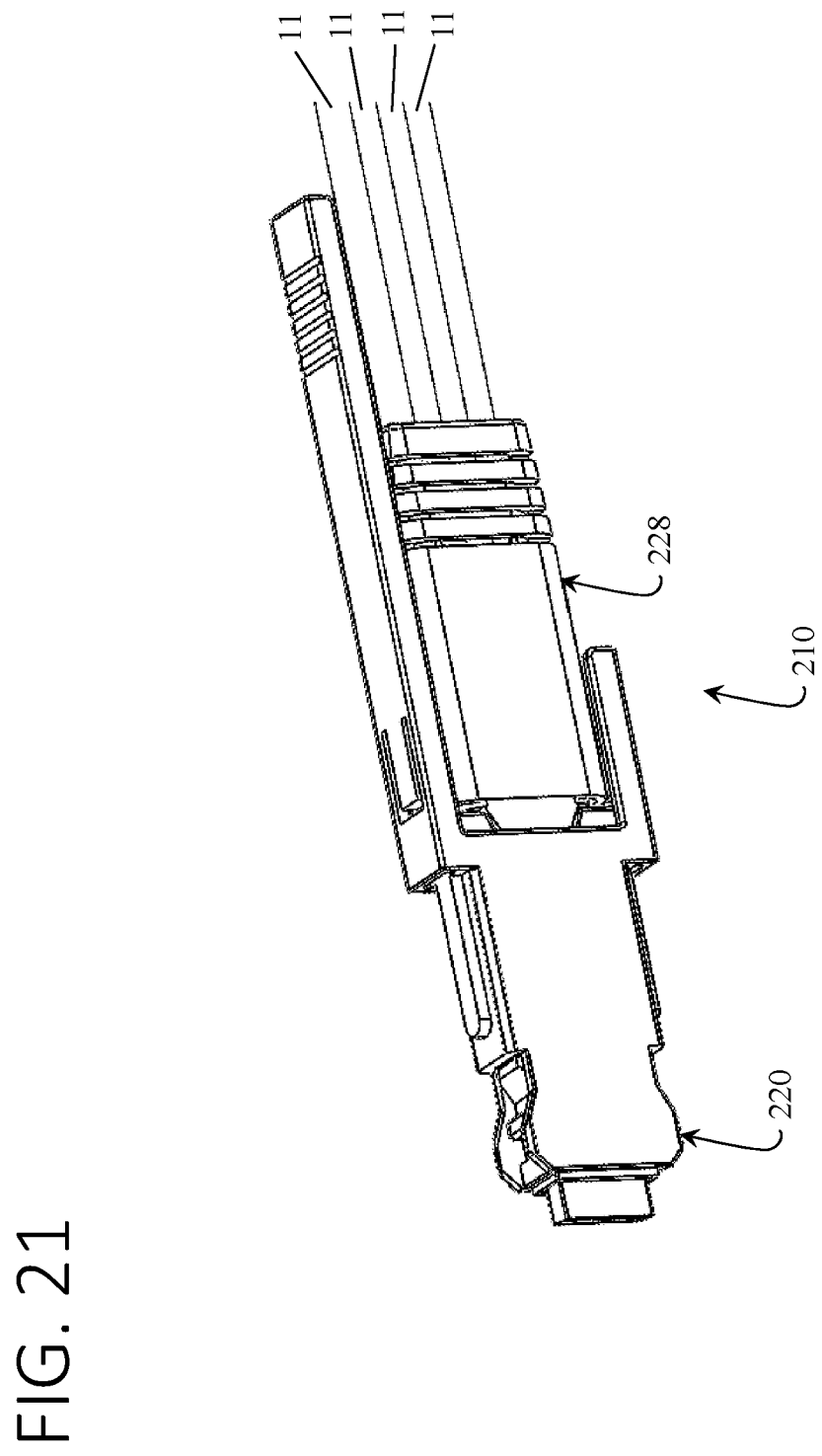
FIG. 21 is a perspective showing the breakout VSFF connector upon completion of the method.

As shown in FIGS. 17 and 18, the strength members 33 are folded forward onto the back post 218 (FIG. 17), advances the crimp ring 226 forward so that the front section 281 receives the back post 218 (FIG. 18), and crimps the front section of the crimp ring onto the back post (FIG. 19). This simultaneously secures the strength members 33 of a plurality of fiber optic cables 11 to a single back post 218 using a single crimp ring 226. Referring to FIG. 20, after the crimp ring 226 is crimped onto the back post 218, curable adhesive is injected into the glue ports 85 to adhesively bond the crimp ring to the cable jackets 35. As shown in FIG. 21, after the adhesive is applied, the breakout connector 210 is complete by advancing the strain relief boot 228 forward onto the back post and loading the inner housing assembly 213 into the outer housing 220.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. An optical fiber connector for terminating a plurality of optical fiber cables, each optical fiber cable comprising a jacket encasing at least one optical fiber and a strength element, the optical fiber connector comprising:
   a connector housing having a back post configured so the optical fibers of the plurality of optical fiber cables extend into the connector housing through the back post; and
   a single crimp ring configured to crimp the strength members of the plurality of optical fiber cables onto the back post;
   wherein the back post has an interior and dividers in the interior that define a plurality of channels;
   wherein the back post is configured to receive the at least one optical fiber of each optical fiber cable in a respective one of the plurality of channels.

2. The optical fiber connector as set forth in claim 1, wherein connector housing comprises a front body, a back body, and a back post cover.

3. The optical fiber connector as set forth in claim 2, wherein the back body and the back post cover are configured to be secured together to form the back post.

4. The optical fiber connector as set forth in claim 3, wherein the optical fiber connector has a longitudinal axis and the back post has a perimeter extending 360° circumferentially around the longitudinal axis.

5. The optical fiber connector as set forth in claim 4, wherein the back body comprises a back post section forming a first circumferential section of the perimeter and the back post cover defines an entire remainder of the perimeter.

6. The optical fiber connector as set forth in claim 4, wherein the back body has a passage and comprises opposite first and second side walls on opposite sides of the passage and a first end wall extending from the first side wall to the second side wall on one side of the passage, the passage having an open side opposite the first end wall.

7. The optical fiber connector as set forth in claim 3, wherein the back body comprises a back post section including the dividers, the dividers being ribs.

8. The optical fiber connector as set forth in claim 7, wherein the back post cover is configured to enclose of each of the plurality of channels.

9. The optical fiber connector as set forth in claim 1, further comprising a multifiber ferrule for terminating the optical fibers of each of the plurality of optical fiber cables.

10. The optical fiber connector as set forth in claim 9, further comprising a ferrule spring configured to yieldably bias the multifiber ferrule forward in the connector housing.

11. The optical fiber connector as set forth in claim 1, further comprising a single strain relief boot disposed on the crimp ring so that each of the plurality of optical fiber cables extends into the optical fiber connector through the single strain relief boot.

12. The optical fiber connector as set forth in claim 1, wherein the crimp ring comprises a glue port configured so that curable adhesive can be injected into the crimp ring through the glue port for adhering the cable jacket of each of the plurality of optical fiber cables to the crimp ring.

13. The optical fiber connector as set forth in claim 1, wherein the connector housing is a VSFF connector housing.

14. The optical fiber connector as set forth in claim 1, wherein the optical fiber connector is configured to terminate four two-fiber optical fiber cables.

15. The optical fiber connector as set forth in claim 1, wherein the optical fiber connector is configured to terminate four eight-fiber optical fiber cables.

16. A method of terminating a plurality of optical fiber cables, the method comprising:
inserting a plurality of optical fiber cables through a single crimp ring;
terminating optical fibers of each of the plurality of optical fiber cables in a multifiber ferrule;
loading the plurality optical fiber cables into a back body of a connector housing, and
crimping strength members of the plurality of optical fiber cables onto a back post of the back body using a single crimp ring.

17. The method as set forth in claim 16, wherein said loading comprises loading the plurality of optical fiber cables laterally into the back body through an open side of the back body.

18. The method as set forth in claim 17, wherein said loading further comprises loading first sections of the optical fibers into divided channels of a back body passage and loading second sections of the optical fibers into an undivided section of the back body passage.

19. The optical fiber connector as set forth in claim 9, wherein each channel has an open front end and an open rear end such that the respective at least one optical fiber is passable through the channel from the respective optical fiber cable to the multifiber ferrule.

20. An optical cable assembly comprising:
a connector housing having a back post configured so the optical fibers of the plurality of optical fiber cables extend into the connector housing through the back post; and
a single crimp ring configured to crimp the strength members of the plurality of optical fiber cables onto the back post; and
a plurality of optical fiber cables, each optical fiber cable comprising a respective jacket encasing at least one respective optical fiber and a respective strength element, the optical fiber connector terminating each of the plurality of optical fiber cables such that each optical fiber cable extends into the connector housing through the back post and the single crimp ring crimps the strength members of each of the plurality of optical fiber cables onto the back post.

\* \* \* \* \*